US006732063B2

(12) United States Patent
Famili et al.

(10) Patent No.: US 6,732,063 B2
(45) Date of Patent: May 4, 2004

(54) METHOD OF IDENTIFYING ABNORMAL BEHAVIOR IN A FLEET OF VEHICLES

(75) Inventors: A. Famili, Orleans (CA); Sylvain Letourneau, Gatineau (CA); Chris O'Brien, Ottawa (CA)

(73) Assignee: National Research Council of Canada, Ottawa (CA)

( * ) Notice: Subject to any disclaimer, the term of this patent is extended or adjusted under 35 U.S.C. 154(b) by 141 days.

(21) Appl. No.: 10/060,388

(22) Filed: Feb. 1, 2002

(65) Prior Publication Data

US 2003/0149550 A1 Aug. 7, 2003

(51) Int. Cl.[7] .................................................. G06F 11/30
(52) U.S. Cl. ..................... 702/188; 702/185; 701/29
(58) Field of Search ............................. 702/188, 33–36, 702/56, 113–115, 159, 182–185, 187, 193, FOR 155, FOR 170–FOR 173, FOR 123–FOR 126, FOR 134, FOR 135, FOR 137, FOR 139; 701/29, 33, 35, 99, 14, 30, 34, 100, 31; 244/1 R; 340/500, 945, 971, 973, 286.01; 706/905, 913

(56) References Cited

U.S. PATENT DOCUMENTS 6,216,066 B1 * 4/2001 Goebel et al. ................. 701/29
6,418,361 B2 * 7/2002 Sinex ........................... 701/29
2003/0045976 A1 * 3/2003 Bechhoefer ................... 701/29

OTHER PUBLICATIONS

"Monitoring of aircraft operation using statistics and machine learning", Fazel Famili et al., 8 pages, (no date).

* cited by examiner

Primary Examiner—Hal Wachsman
(74) Attorney, Agent, or Firm—Marks & Clerk

(57) ABSTRACT

A method is disclosed for monitoring a complex system, such as a fleet of aircraft, having multiple sub-systems described by a plurality of operating parameters. Data pertaining to the operating parameters is continually generated during operation of the vehicles. The data is normalized to take into account variability factor and stored in a central database. New incoming data from the sub-systems is continually compared with the stored data to identify abnormalities. The invention is applicable to the monitoring of a fleet of aircraft.

10 Claims, 4 Drawing Sheets

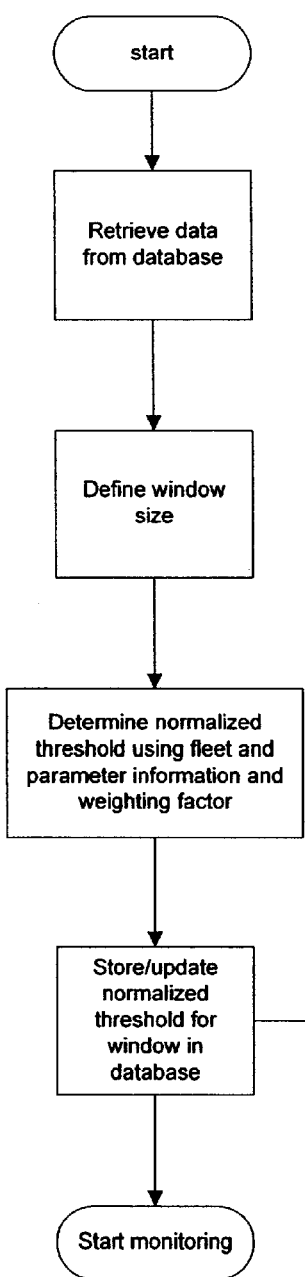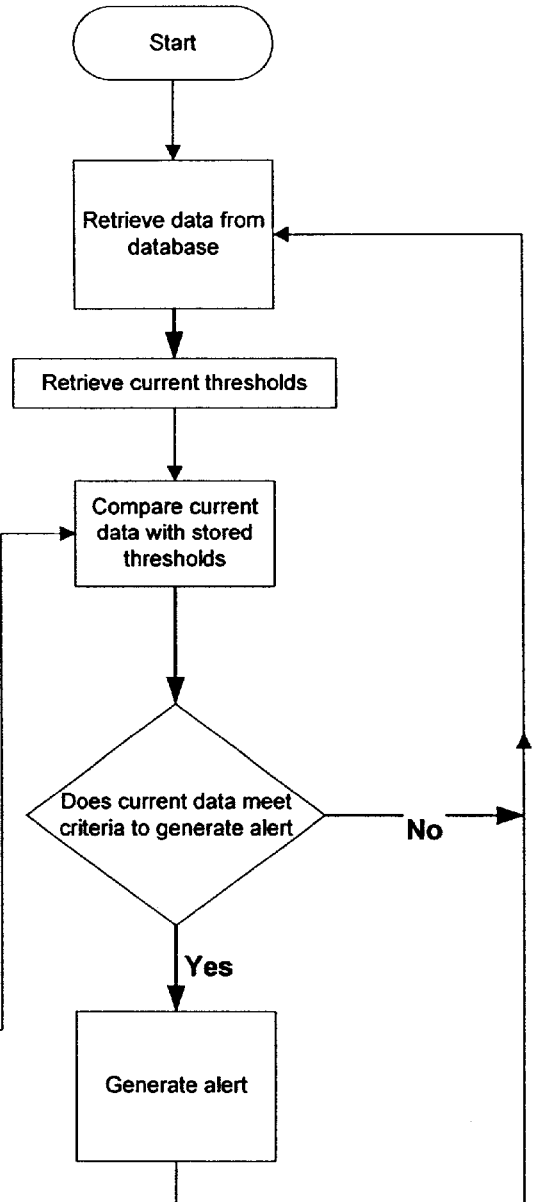
FIG. 5A  FIG. 5B

METHOD OF IDENTIFYING ABNORMAL BEHAVIOR IN A FLEET OF VEHICLES

BACKGROUND OF THE INVENTION

1. Field of the Invention

This invention relates to generally to the field of data mining, and in particular to of monitoring a complex system having multiple sub-systems described by a plurality of operating parameters. The invention is particularly well suited to identifying abnormal behavior in a fleet of vehicles, but it can be applied to other complex systems. The invention is primarily applicable to aircraft, but could be applied to other types of vehicle. Such behavior might, for example, relate to engine operation or other critical flight systems. The behavior is measured in parameters that might include exhaust gas temperature, core vibration, fuel flow etc.

2. Description of Related Art

Efficient operation and maintenance of modern aircraft, particularly "fly-by-wire" aircraft involves processing large amounts of sensor data. Sensors continually monitor all aspects of flight systems. Proper use of the data requires an understanding of its contents, the ability to analyze it properly, and the ability to identify when and in which part of a large fleet of aircraft a particular condition or performance parameter is not within the allowable range. Proper alerts must be generated for maintenance staff along with an explanation of the probable cause for an abnormal situation.

This requires access to a variety of data, the most important part of which is sensor measurement/data included in individual aircraft reports (e.g. engine cruise report, engine, take off report). These reports are generated on a regular basis pursuant to a request or when a deviation of one or more parameters occur. The operation and proper maintenance of aircraft becomes more difficult as the airline fleet becomes larger and more and more parameters need to be closely monitored. Engineers and fleet specialists must constantly be aware of the status of all aircraft systems and must be able to investigate any abnormal behaviors as soon as they occur. The investigation requires an explanation as what may be the cause of any abnormal situation.

One possible approach to the above problem is to analyze aircraft parametric data, using a data analysis tool, and search for patterns or useful information in the data that may explain the problem. Almost all commercial data analysis tools assume that the data collected from a particular process (such as the operation of an aircraft) can be easily analyzed, trends and patterns accurately recognized and any discoveries presented to the user in an understandable way. Aerospace is one of the domains in which these assumptions are not valid. Even when a data analysis tool is selected, all users must have sufficient training and time to acquire the data, properly use the data analysis tool and go through the ordinary process of data analysis in order to discover a useful knowledge that they need. However, in the aerospace industry, like many other industries, it is difficult to expect engineers and technicians to follow the normal data mining path. Several reasons exist for this. All the required data may not be integrated into one database management system. The engineers and operators do not have sufficient time to analyze huge amounts of data, unless there is an urgent requirement. Complexity of the data analysis process is beyond the ordinary tools that they have access to, in most cases. There is no well defined automated mechanism to extract, pre-process and analyze the data, and summarize the results so that the engineers and technicians can use it. Even when there are tools available for data analysis, these tools are specific for certain tasks defined by the vendors.

There are two possible approaches to this problem. One approach is the batch mode in which an aerospace engineer has to select a given amount of historical data and having a problem in mind uses a commercial data mining software tool to analyze the data and search for useful patterns in the data. This is usually an iterative and time consuming process that may help in identifying an abnormal situation in the operation of the aircraft for which the data was collected.

In the batch mode, the data collection and selection process is time consuming and has to be accurate. The user has to have a good understanding of the data mining process and the problem for which the data mining tool is used. In many cases, there is a need for data cleaning, as there may be various problems in the data, such as out-of-range data, missing data, etc. The user needs to have some leads as to where there is a problem so that relevant data is selected and analyzed. In many cases, even when there are some results, it may be too late for aerospace engineers to properly use them. Finally, the user needs an explanation as to what may be the cause of any problem.

The other approach is the on-line mode, in which a vendor (such as an engine manufacturer) provides a software application that can be used to generate alerts about the performance of certain system parameters for which the software has been designed. The problem with this mode is that the airline staff need to acquire dedicated software for every system for which they have the data and want to monitor performance. This is not possible for all systems on board today's aircraft as there is no monitoring software for every system for which the data is available. Even when such software systems are used, airline staff can only monitor parameters that these software systems are capable of monitoring. An example is SAGE software provided by General Electric to monitor certain parameters of aircraft engines. Systems such as SAGE generate alerts that are not necessarily relevant for a given airline, due to different modes of operation. Finally, there is no explanation to support any identified abnormal situation as to what maybe the cause of that situation.

A data mining system has been described in the above SAGE system that continually gathers data from a number of sources and generates alerts when certain normalized thresholds are exceeded. While this is an excellent potential technique for solving the above problems, it does not take into account the realities of the real world, where one needs to take into account the performance of the fleet as a whole. For example, as the fleet as a whole ages, the nominal thresholds will shift.

There is a need to a monitoring system that will alleviate these shortcomings of the prior art.

SUMMARY OF THE INVENTION

According to the present invention there is provided a method of monitoring a complex system having multiple sub-systems described by a plurality of operating parameters, comprising continually generating data pertaining to said operating parameters during operation of said system; storing said data in a central database; defining a window of samples over which data is to be analyzed; normalizing said data to take into account variability factors and introduce a weighting factor to define thresholds dependent on the performance of individual monitored components and the performance of said components across the fleet; storing said defined thresholds for said defined window; and continually comparing new incoming data from said sub-systems with said stored defined thresholds to identify abnormalities in the system.

The weighting factor in the calculation of the threshold is important to allow the effects of the sub-systems, typically aircraft, and the complex system, typically the fleet, to be balanced. The weighting factor prevents the generation of unnecessary alerts. Introduction of the weighting factor resulted from extensive experiments in which a weighting factor was not used and the effects of both aircraft and fleet mean and standard deviation were equally taken into account.

The invention permits all aircraft systems (e.g. auxiliary power units, main engines) for which data is available to be continuously monitored using an integrated software system. The monitoring is performed so that the fleet specialists and engineers are informed of conditions when there is a deviation in the range of one or more parameters (such. as exhaust gas temperature), compared to an expected level which is dynamically adjusted as a function of certain operation and data conditions, or when there is an abnormal behavior in the operation of a system (such as an upward or a downward trend in certain performance parameters) that may cause performance deterioration of one or more systems.

First, the data generated by the aircraft is pre-processed and stored in a database. The pre-processing is performed so that a more accurate representation of the data is used throughout the fleet monitoring process. It is also important so that as many relevant parameters as possible are used for the monitoring process and a useful level of precision is applied for the parameter values. The pre-processed data, that contains new features, is then provided to the fleet monitoring module which searches for trends and other useful information related to abnormal behaviors of aircraft systems. An alert is generated for every abnormal situation that is identified. Alerts generated through this process are presented to the users (engineers and fleet specialists) for their attention. Depending on the type of alert and its relevant parameters, different actions nay be taken upon each alert. The user could also request for additional information about the cause of an alert.

The invention allows early identification of the problems related to abnormal situations of aircraft. There is no need to use multiple software systems to monitor different aircraft systems (e.g. auxiliary power units, engines, avionics, etc.). Only problematic aircraft and their systems are flagged without waiting for the airline staff to search for problems. The detection of trends in data and identification of abnormal situations is based on the airline method of operation rather than on test cell data.

Alerts can be received and filtered, as per user's level of interest and responsibility. Machine learning techniques can provide further explanation about the cause of alerts.

The invention is generic and independent of the system for which it is used. It can be applied to other domains where complex systems need to be closely monitored and properly maintained. An example is clean room equipment in semiconductor wafer fabrication.

BRIEF DESCRIPTION OF THE DRAWINGS

The invention will now be described in more detail, by way of example, only with reference to the accompanying drawings, in which:—

FIG. 5A is a flowchart illustrating one example of the normalization of the data; and FIG. 5B is a flowchart illustrating the generation of alerts.

DETAILED DESCRIPTION OF THE PREFERRED EMBODIMENTS

Figure 1:
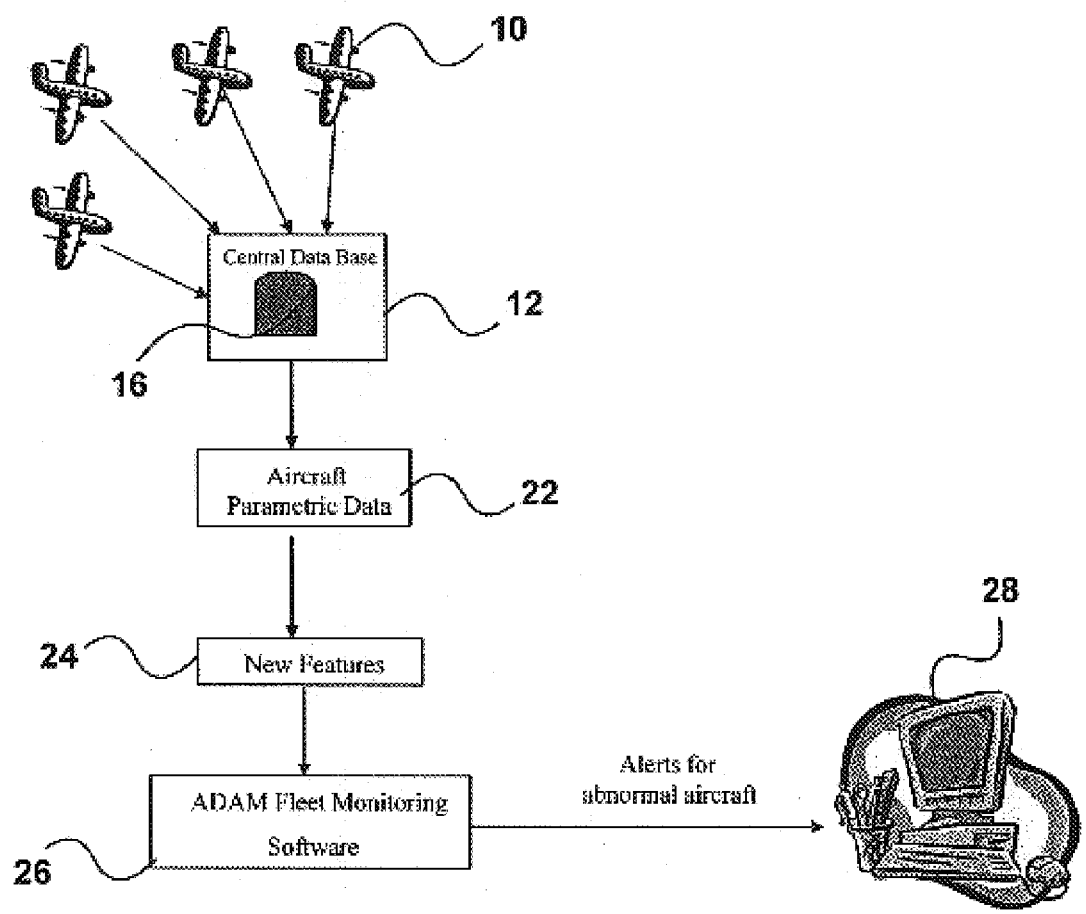
FIG. 1 is a schematic diagram of a fleet monitoring system illustrating the flow of data.

In FIG. 1, a fleet of aircraft 10 each include sensors monitoring aircraft systems, such as engine parameters and the like. Typical parameters include exhaust gas temperature, core vibration, and fuel flow. The data is sent back from aircraft 10 over air-to-ground links 20 to a central processing station 12 where the data is stored in a central database 16 for subsequent mining in accordance with the principles of the invention.

The central database 16 contains all the data generated during the operation of the aircraft. This includes all messages, snags and parametric data concerning performance of the aircraft systems. A typical example of parametric data would be an engine cruise report that contains all the engine parametric data plus other aircraft-related information.

The parametric data, which typically represents 100–150 sensor measurements, mostly in the form of numeric data, is extracted from the database 16 at block 22 and passed to functional block 24, where it is analyzed to derive "new features", which are numeric values derived from the original reports. An example would be the percentage of cases that exceed a certain threshold within a time window.

The monitoring software 26 monitors the performance of all aircraft for which it has the data and generates a warning message at console 28 when an abnormal situation is detected by the software 26. Warning messages generated by fleet monitoring software 26 when there is an abnormal situation in the operation of an aircraft typically include the following information: Aircraft number, System Type (e.g. Main Engine), Alert Identification Number, Alert Date, Alert Status (e.g. new, or acknowledged), and Alert Description (e.g. Oil pressure for Engine 1 is abnormal).

In accordance with the principles of the invention, the incoming data from the aircraft 10 are monitored over a specific window size. A window corresponds to a specific number of samples. For example, a window might be chosen so that the data is monitored over the last month or the last week. The window is continually monitored to search for certain alert conditions based on the normalized threshold of any single parameter. This takes into account factors such as system operation, system age and airline operational procedures.

The normalized threshold is the expected marginal value of a given parameter. A simple example of calculating a normalized threshold for an engine related parameter is as follows: When a new window is opened, for a given engine parameter (p), the quantities fleet-mean-p, engine-mean-p, fleet-standard-deviation-p, and engine-standard-deviation-p are calculated for the last 365 days of data. This includes the data from the new window. These parameters are then used to calculate a normalized threshold for each parameter, which are then stored in the central database 16. However, in order to allow the system to layer more emphasis on the performance of the fleet or on the engine itself, a weighting factor w is introduced. So the normalized threshold for a given window becomes:

Normalized-threshold-$p$=(fleet-mean-$p$*$w$+engine-mean-$p$*(1−$w$))±($X$*(fleet-standard-deviation-$p$*$w$+engine-standard-deviation-$p$*(1−$w$)))

where: p=parameter of interest,
w=weighting factor, $0 \leq w \leq 1$
X=threshold adjustment based on the standard deviation
An alert (A) is therefore a function of:

$$A = f(p, ws, wo, nt, ac)$$

where: p=parameter of interest
ws=window size, (number of cases)
wo=window overlap,
nt=current normalized threshold,
ac=alert condition.

A simple example of an alert condition (ac) is "percent of excedence from current normalized threshold". The parameters ws and wo are determined through experiments. Different alert conditions may require different values for these two parameters.

FIG. 5A illustrates the process of normalizing the data.

In an alternative approach, known as multivariate monitoring, the incoming data is monitored for specific windows in which a search is made for certain alert conditions based on the current normalized thresholds of all parameters of interest. This approach allows for monitoring of a conjunction of all, or disjunction of a number of parameters at any time. Individual normalized thresholds are used in this approach.

An alert (A) is therefore a function of:

$$A = f((p_1, ws, wo, nt_1, ac_1), (p_1, ws, wo, nt_2, ac_2), \ldots (p_n, ws, wo, nt_i, ac_i), ce]$$

Where: $p_i = i^{th}$ parameter of interest,
ws=window size, (number of cases)
wo=window overlap,
$nt_i$=current normalized threshold for parameter i,
$ac_i$=alert condition for parameter i,
ce=combination expression,
n=number of parameters of interest.

The combination expression (ce) is the logical expression for combining $ac_1, ac_2, \ldots ac_n$.

Figure 2:
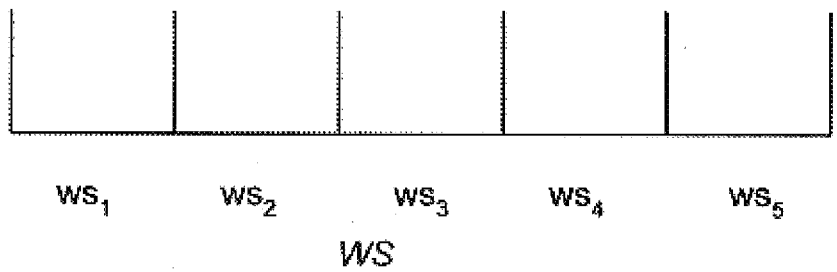
FIG. 2 shows a window partitioning scheme.

In a further approach known as multivariate partitioning, the incoming data is monitored for specific windows, where each window is further partitioned into smaller windows of equal size. FIG. 2 shows a window of size Ws partitioned into five equal size windows ($ws_1, ws_2, ws_3, ws_4$, and $ws_5$). New sets of dimensionless attributes that are derived from this partitioning process are used for trend recognition. A simple example of a dimensionless attribute is the ratio of positive cases between all possible pairs of smaller windows ($ws_1$) of any Ws. A positive case is one that meets certain trend criteria. An example of a trend criteria is when a combination expression is conjunction, and more than 50% of the ratios for all monitored parameters, are greater than 1. The total number of dimensionless attributes (da) for any trend criteria is given by the expression $$da = \sum_{i=1}^{np-1} i$$

where np is the number of partitions. For example, for np=5, da=1+2+3+4=10.

In this case, an alert (A) is therefore a function of the following parameters for as many conditions or performance parameters that are of interest:

$$A = f[(p_1, ws, wo, np, nt_i, tc_1), (p2, ws, wo, np, nt_2, tc_2), \ldots (p_n, ws, wo, np, nt_n, tc_n), ce]$$

Where: $p_i$=ith parameter of interest,
ws=window size, (number of cases)
wo=window overlap,
np=number of partitions,
$nt_i$=current normalized threshold for parameter i,
$tc_i$=trend criteria for parameter i,
ce=combination expression,
n=number of parameters of interest.

FIG. 5B illustrates the process of generating alerts from the retrieved data.

Figure 3:
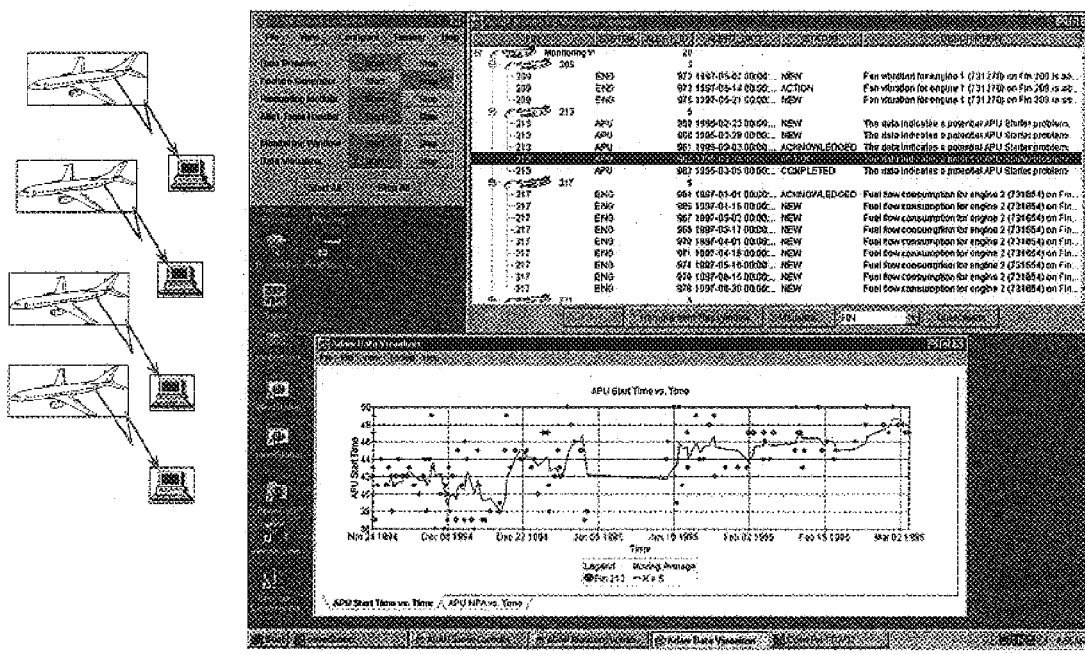
FIG. 3 is an illustration of a screen showing alerts generated by a monitoring system in accordance with the invention.

FIG. 3 shows how the monitoring system works. When the system detects an abnormality, a meaningful message is generated and displayed on the screen of console 28. For example, the first entry shows a fan vibration in engine no. 1 of a specific aircraft identified by the reference 209. The lower part of the screen shows a plot of APU (Auxiliary Power Unit) start times over a period of time, and illustrates why the system has determined there may be a potential APU starter problem.

Figure 4:
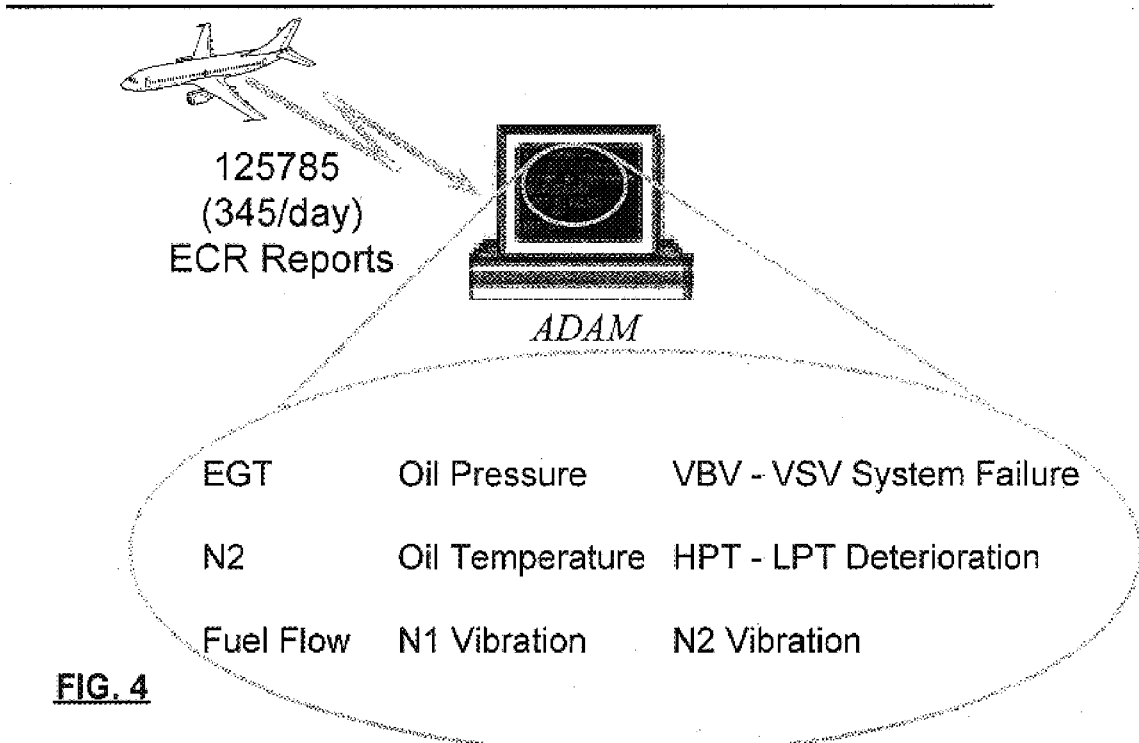
FIG. 4 illustrates an example of some monitored system parameters.

FIG. 4 shows examples of various parameters that can be monitored and alerts that can be given. These reports can be generated on a yearly basis. FIG. 4 shows, by way of illustration, how a report might be presented for the year 1998.

The invention provides an efficient way to monitor a fleet of vehicles or other complex system on an on-going basis. It can provide an early warning in real-time of potential problems without relying on skilled operators to identify anomalies.

We claim:

1. A method of monitoring a complex system having multiple sub-systems described by a plurality of operating parameters, comprising:
   continually generating data pertaining to said operating parameters during operation of said system;
   storing said data in a central database;
   defining a window of samples over which said data is to be analyzed;
   normalizing said data to take into account variability factors and introduce a weighting factor to define thresholds dependent on the performance of individual monitored components and the performance of said components across the system;
   storing said defined thresholds for said defined window; and
   continually comparing new incoming data from said sub-systems with said stored defined thresholds to identify abnormalities in the system.

2. A method as claimed in claim 1, wherein said window represents a specific time period.

3. A method as claimed in claim 1, wherein each said threshold represents the expected marginal value of a given parameter.

4. A method as claimed in claim 3, wherein each said threshold is determined according to the formula:

$$\text{threshold} = (\text{fleet-mean-}p*w + \text{component-mean-}p*(1-w)) \pm (X*(\text{fleet-standard-deviation-}p*w + \text{component-standard-deviation-}p*(1-w)))$$

where: p=parameter of interest,
w=weighting factor, $0 \leq w \leq 1$
X=threshold adjustment based on the standard deviation.

5. A method as claimed in claim 4, wherein an alert A is generated when an abnormality is identified.

6. A method as claimed in claim 5, wherein said alert A is a function of:

A=ƒ(p, ws, wo, nt, ac)

where: p=parameter of interest
ws=window size, (number of cases)
wo=window overlap,
nt=current normalized threshold,
ac=alert condition and wherein an alert condition ac represents a percent of excedence from a current normalized threshold.

7. A method as claimed in claim 1, wherein each said window is partitioned into smaller windows of equal size, and the data in said smaller windows is compared to identify trends.

8. A method as claimed in claim 1, wherein an alert A is generated when an abnormality is generated, and said alert is a function of:

$$A = \{f((p_1, ws, wo, nt_1, ac_1), (p_1, ws, wo, nt_2, ac_2), \ldots (p_n, ws, wo, nt_i, ac_i), ce]$$

where: $p_{i \ldots n}$ are parameters of interest,
ws=window size, (number of cases)
wo=window overlap,
$nt_i$=current normalized threshold for parameter i,
$ac_i$=alert condition for parameter i,
ce=combination expression,
n=number of parameters of interest and wherein an alert condition ac represents a percent of excedence from a current normalized threshold.

9. A method as claimed in claim 1, wherein said subsystems are located on a fleet of vehicles transferring data pertaining to said operating parameters to said central database.

10. A method as claimed in claim 9, wherein said vehicles are aircraft connected to said central database by an air-to-ground link.

* * * * *